United States Patent
Choi (10) Patent No.: US 9,538,085 B2
(45) Date of Patent: Jan. 3, 2017

(54) METHOD OF PROVIDING PANORAMIC IMAGE AND IMAGING DEVICE THEREOF

(75) Inventor: Jong-yun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 522 days.

(21) Appl. No.: 13/618,344

(22) Filed: Sep. 14, 2012

(65) Prior Publication Data

US 2013/0135428 A1    May 30, 2013

(30) Foreign Application Priority Data

Nov. 29, 2011  (KR) .................. 10-2011-0125738

(51) Int. Cl.
*H04N 5/225* (2006.01)
*H04N 5/232* (2006.01)

(52) U.S. Cl.
CPC ...... *H04N 5/23293* (2013.01); *H04N 5/23238* (2013.01)

(58) Field of Classification Search
CPC ......... G03B 37/00; G03B 37/02; G03B 37/04; G03B 37/06; G06T 2200/32; G06T 3/0087; G06T 3/4038; G06T 3/40; H04N 5/3415; H04N 5/23238
USPC ................. 348/36, 37, 38, 39, 700
See application file for complete search history.

(56) References Cited

U.S. PATENT DOCUMENTS

| | | | |
|---|---|---|---|
| 6,507,358 B1* | 1/2003 | Mori | H04N 5/2259 348/42 |
| 2003/0107586 A1* | 6/2003 | Takiguchi | G06T 3/4038 345/629 |
| 2004/0125133 A1* | 7/2004 | Pea | G06F 17/30014 715/751 |
| 2006/0062296 A1 | 3/2006 | Li et al. | |
| 2006/0120624 A1* | 6/2006 | Jojic | G06F 17/30843 382/284 |
| 2006/0188175 A1* | 8/2006 | Takiguchi | G06T 3/4038 382/284 |
| 2007/0030396 A1* | 2/2007 | Zhou | G06F 17/30802 348/700 |

(Continued)

FOREIGN PATENT DOCUMENTS

| | | |
|---|---|---|
| EP | 0810776 | 12/1997 |
| EP | 2073539 | 6/2009 |
| JP | 11-134352 | 5/1999 |

OTHER PUBLICATIONS

European Search Report dated Mar. 6, 2013 issued in EP Application No. 12187185.9.

*Primary Examiner* — Sath V Perungavoor
*Assistant Examiner* — Clifford Hilaire
(74) *Attorney, Agent, or Firm* — Staas & Halsey LLP (57) ABSTRACT

A method of providing a panoramic image and an imaging device thereof. The method may include: extracting at least one panoramic section, which is to generate a panoramic image, from moving picture data; displaying at least one thumbnail image respectively corresponding to the at least one panoramic section on a display screen; and if one of the at least one thumbnail image is selected, generating a panoramic section corresponding to the selected thumbnail image as a panoramic image. Therefore, even if a user performs capturing without the aim of acquiring a panoramic image at a capturing time, the user can aquire a panoramic image later by using moving picture data.

15 Claims, 6 Drawing Sheets

(56) References Cited

U.S. PATENT DOCUMENTS

| | | | |
|---|---|---|---|
| 2007/0263076 A1* | 11/2007 | Andrews | H04N 7/148 348/14.08 |
| 2010/0097443 A1* | 4/2010 | Lablans | G03B 37/00 348/36 |
| 2010/0118161 A1 | 5/2010 | Tsurumi | |
| 2011/0182512 A1 | 7/2011 | Nishi | |

* cited by examiner

METHOD OF PROVIDING PANORAMIC IMAGE AND IMAGING DEVICE THEREOF

CROSS-REFERENCE TO RELATED APPLICATIONS

This application claims priority under 35 U.S.C. §119 from Korean Patent Application No. 10-2011-0125738, filed on Nov. 29, 2011, in the Korean Intellectual Property Office, the disclosure of which is incorporated herein by reference in its entirety.

BACKGROUND OF THE INVENTION

1. Field of the Invention

The present general inventive concept generally relates to a method of providing a panoramic image and an imaging device thereof, and more particularly, to a method of providing a panoramic image by using moving picture data, and an imaging device thereof.

2. Description of the Related Art

The recent development of an imaging device and an image processing method enables a user to acquire various types of images by using the imaging device. In particular, the user acquires a panoramic image by using a super-wide-angle lens, which is capable of capturing a wide range, or a panoramic photographing mode.

However, since the super-wide-angle lens is very expensive and does not support a panoramic photographing mode with respect to all types of imaging devices, the user cannot easily acquire a panoramic image.

Also, in order to acquire a panoramic image, the user is to capture images in predetermined conditions (e.g., a direction, an exposure, etc.) with the aim of capturing a panorama from the beginning when capturing an image and then synthesize the captured images to generate a panoramic image.

Accordingly, if the user performs capturing without the aim of capturing a panoramic image at a capturing time, it is difficult for the user to acquire a panoramic image later.

SUMMARY OF THE INVENTION

Exemplary embodiments address at least the above problems and/or disadvantages as well as other disadvantages not described above. Also, the exemplary embodiments are not limited to overcoming the disadvantages described above, and an exemplary embodiment may not be limited to addressing and/or overcoming any of the problems described above.

The exemplary embodiments provide a method of providing a panoramic image by which a panoramic section for generating a panoramic image is extracted from captured moving picture data to generate a panoramic image, and an imaging device thereof.

Additional features and utilities of the present general inventive concept will be set forth in part in the description which follows and, in part, will be obvious from the description, or may be learned by practice of the general inventive concept.

Embodiments of the present general inventive concept provide a method of generating a panoramic image of an imaging device. The method may include: extracting at least one panoramic section, which is to generate a panoramic image, from moving picture data; displaying at least one thumbnail image respectively corresponding to the at least one panoramic section on a display screen; and if one of the at least one thumbnail images is selected, generating a panoramic section corresponding to the selected thumbnail image as a panoramic image.

Motion vector information of an image frame constituting the moving picture data may be analyzed, and a moving direction of an image may be determined through the analyzed motion vector information to extract the at least one panoramic sections.

A characteristic dot may be extracted from the image frame constituting the moving picture data, and a motion of the image may be determined according to a moving direction of the characteristic dot to extract the at least one panoramic sections.

The thumbnail image may be a first image frame of the panoramic section.

A plurality of image frames included in the panoramic section may overlap with one another, and overlapping boundary interfaces may be interpolated to generate the panoramic image.

If photographing setting conditions of the plurality of image frames comprised in the panoramic section are changed, an average value of pixels included in an overlapping area of the plurality of image frames may be calculated, and the panoramic image may be generated by using a pixel having the calculated average value.

The method may further include: if the panoramic image is generated, storing the panoramic image and metadata of the panoramic image along with the moving picture data.

The method may further include: if the panoramic image is generated, storing the panoramic image and metadata of the panoramic image separately from the moving picture data.

The method may further include displaying a panoramic image list comprising the generated panoramic image.

The method may further include: if a panoramic image is selected from the panoramic image list, playing the moving picture data starting from a panoramic section corresponding to the selected panoramic image.

According to another aspect of the exemplary embodiments, there is provided an imaging device. The imaging device may include: a display unit; and a controller which extracts at least one panoramic section, which is to generate a panoramic image, from moving picture data, displays at least one thumbnail image respectively corresponding to the at least one panoramic sections on the display unit, and if one of the at least one thumbnail images is selected, generates a panoramic section corresponding to the selected thumbnail image as a panoramic image.

The controller may analyze motion vector information of an image frame constituting the moving picture data and determine a moving direction of an image through the analyzed motion vector information to extract the at least one panoramic section.

The controller may extract a characteristic dot from the image frame constituting the moving picture data and determine a motion of the image according to a moving direction of the characteristic dot to extract the at least one panoramic section.

The thumbnail image may be a first image frame of the panoramic section.

The controller may overlap a plurality of image frames comprised in the panoramic section and interpolate overlapping boundary interfaces to generate the panoramic image.

If photographing setting conditions of the plurality of image frames comprised in the panoramic section are changed, the controller may calculate an average value of pixels included in an overlapping area of the plurality of image frames and generate the panoramic image by using a pixel having the calculated average value.

The imaging device may further include a storage unit. If the panoramic image is generated, the controller may control the storage unit to store the panoramic image and metadata of the panoramic image along with the moving picture data.

The imaging device may further include a storage unit. If the panoramic image is generated, the controller may control the storage unit to store the panoramic image and metadata of the panoramic image separately from the moving picture data.

The controller may control the display unit to display a panoramic image list comprising the generated panoramic image.

If a panoramic image is selected from the panoramic image list, the controller may play the moving picture data starting from a panoramic section corresponding to the selected panoramic image.

According to another aspect of the exemplary embodiments, there is provided a method of generating a panoramic image of an imaging device, the method comprising: extracting at least one panoramic section from a captured image moved in a predetermined direction; displaying at least one thumbnail image respectively corresponding to the extracted at least one panoramic section on a display; and generating a panoramic section corresponding to the selected thumbnail image as a panoramic image.

In an embodiment, the panoramic section is extracted by using motion vector information from moving picture data.

In an embodiment, the thumbnail image is a first image frame of the panoramic section.

In an embodiment, the panoramic image is generated by overlapping a plurality of image frames included in the panoramic section and interpolating overlapping boundary interfaces among the plurality of image frames.

In an embodiment, if photographing setting conditions of the plurality of image frames included in the panoramic section are changed, an average value of pixels included in an overlapping area of the plurality of image frames is calculated and the panoramic image is generated by using a pixel having the calculated average value.

According to another aspect of the exemplary embodiments, there is provided an imaging device, comprising: a display unit; and a controller to extract at least one panoramic section from a captured image moved in a predetermined direction, display at least one thumbnail image respectively corresponding to the extracted at least one panoramic section on a display, and generate a panoramic section corresponding to the selected thumbnail image as a panoramic image.

According to another aspect of the exemplary embodiments, there is provided a non-transient computer readable storage medium containing codes to perform a method of generating a panoramic image of an imaging device, the method comprising: extracting at least one panoramic section from a captured image moved in a predetermined direction; displaying at least one thumbnail image respectively corresponding to the extracted at least one panoramic section on a display; and generating a panoramic section corresponding to the selected thumbnail image as a panoramic image.

According to another aspect of the exemplary embodiments, there is provided a non-transient computer readable storage medium containing codes to perform a method of generating a panoramic image of an imaging device, the method comprising: extracting at least one panoramic section, which is to generate a panoramic image, from moving picture data; displaying at least one thumbnail image respectively corresponding to the at least one panoramic section on a display screen; and if one of the at least one thumbnail image is selected, generating a panoramic section corresponding to the selected thumbnail image as a panoramic image.

BRIEF DESCRIPTION OF THE DRAWINGS

The above and/or other features and utilities of the present general inventive concept will be more apparent by describing certain exemplary embodiments with reference to the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
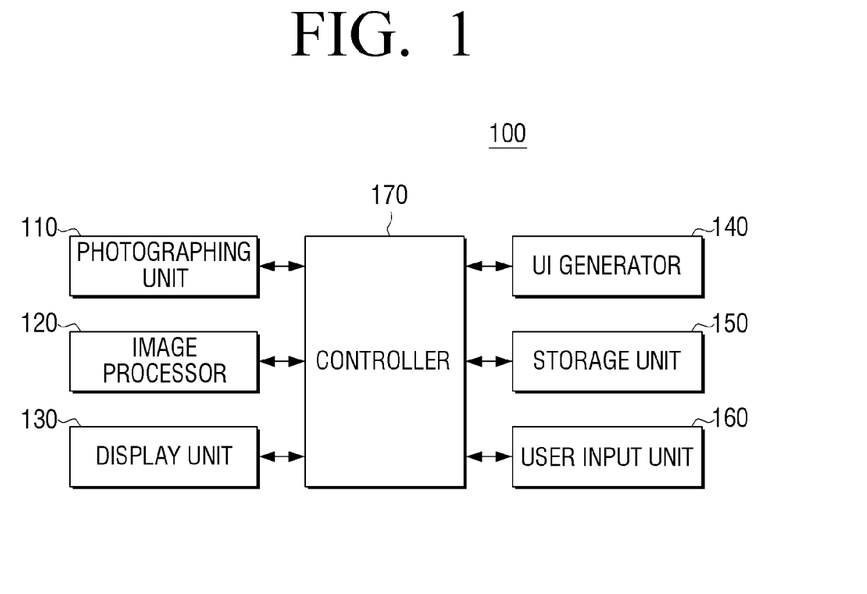
FIG. 1 is a block diagram illustrating a structure of an imaging device according to an exemplary embodiment of the present general inventive concept.

FIG. 1 is a block diagram illustrating a structure of an imaging device 100 according to an exemplary embodiment of the present general inventive concept. Referring to FIG. 1, the imaging device 100 includes a photographing unit 110, an image processor 120, a display unit 130, a user interface (UI) generator 140, a storage unit 150, a user input unit 160, and a controller 170. The imaging device 100 may be a digital camera, but is not limited thereto. For example, the imaging device 100 may be realized as a portable phone, a personal digital assistant (PDA), a tablet PC, an electronic pad, a camcorder, a TV, or the like which includes a photographing unit.

The photographing unit 110 includes a shutter (not shown), a lens unit (not shown), an aperture (not shown), a charge-coupled device (CCD) image sensor (not shown), and an analog-to-digital-converter (ADC) (not shown). The shutter is an apparatus which adjusts an amount of exposed light along with the aperture. The lens unit receives light from an external light source to process an image. Here, the aperture adjusts an amount of incident light according to its opening and closing degrees. The CCD image sensor accumulates the amount of the light input through the lens unit and outputs an image captured by the lens unit according to a vertical sync signal. An image acquisition of the imaging device 100 is achieved by the CCD image sensor which converts light reflected from an object into an electronic signal. A color filter is required in order to acquire a color image by using the CCD image sensor, and a color filter array (CFA) is mostly used. The CFA has an array structure in which each single pixel transmits only light showing one color and in which pixels are regularly arrayed. The CFA may also have various forms according to array structures. The ADC converts an analog image signal output from the CCD image sensor into a digital signal.

The photographing unit 110 captures an image as described above, but this is only an exemplary embodiment. Therefore, the photographing apparatus 110 may capture an image by using another method. For example, the photographing unit 110 may capture an image by using a complementary metal oxide semiconductor (CMOS) image sensor instead of the above-described CCD image sensor.

The image processor 120 signal-processes digitally-converted raw data under control of the controller 170 so that the raw data is displayable. The image processor 120 removes black levels formed by a black current which is generated from the CCD image sensor, sensitive to temperature, and the CFA. The image processor 120 performs a gamma correction which is to encode information according to nonlinearity of a human vision. The image processor 120 performs a CFA interpolation which is to interpolate a Bayer pattern realized with RGRG lines and GBGB lines of predetermined data which has been gamma-corrected. The image processor 120 performs an edge correction which is to convert an interpolated RGB signal into a YUV signal and filter a Y signal through a high-pass filter (HPF) to make an image clear. The image processor 120 also performs a color correction which is to correct color values of U and V signals by using a standard color coordinate system and removes noise from the U and V signals. The image processor 120 compresses and signal-processes the Y, U, and V signals, from which noise has been removed, to generate a JPEG file. The generated JPEG file is displayed on the display unit 130 and stored in the storage unit 150.

The method of how the image processor 120 processes an image as described above is only an exemplary embodiment, and thus the image processor 120 may process the image by using another method.

The display unit 130 displays image data processed by the image processor 120 or image data stored in the storage unit 150. The display unit 130 also displays a user interface (UI) generated by the UI generator 140. In particular, the display unit 130 may be controlled by the controller 170 to display a thumbnail image list including a plurality of thumbnail images respectively corresponding to a plurality of image data.

The UI generator 140 generates an On Screen Display (OSD) type UI under control of the controller 170.

The storage unit 150 stores a program and data necessary to drive the imaging device 100 and the image data processed by the image processor 120.

The user input unit 160 receives a user command. Here, the user input unit 160 may be realized as a shutter, a button, a touch screen, or the like which is provided to be exposed with respect to the imaging device 100.

The controller 170 controls an overall operation of the imaging device 100 according to the user command input through the user input unit 160. In particular, the controller 170 extracts at least one panoramic section, which is/are to generate a panoramic image, from moving picture data. The controller 170 displays at least one thumbnail image respectively corresponding to the extracted at least one panoramic section on the display unit 130. If one of the at least one thumbnail image is selected through the user input unit 160, the controller 170 generates a panoramic section corresponding to the selected thumbnail image as a panoramic image.

In detail, the controller 170 plays the moving picture data according to the user command input through the user input unit 160.

If a user command to extract an image section (hereinafter referred to as a panoramic section) for generating a panoramic image is input to the imaging device 100 via the user input unit 160, the controller 170 extracts at least one panoramic section from the moving picture data. Here, the panoramic section refers to a section in which a captured image is moved in a predetermined direction so as to generate a panoramic image.

Figure 2:
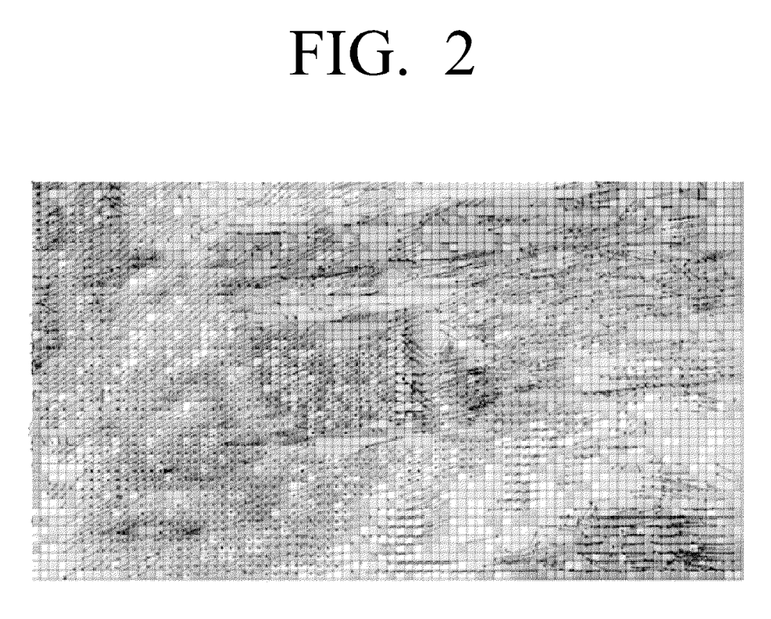
FIGS. 2 through 7 are views illustrating a method of generating a panoramic image by using moving picture data and a method of playing moving picture data by using the generated panoramic image according to an exemplary embodiment of the present general inventive concept.
Figure 3:
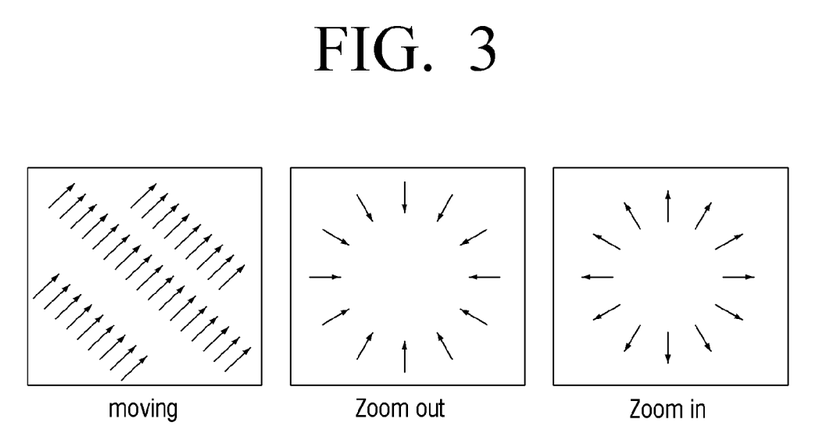

Here, the controller 170 may extract the panoramic section by using motion vector information of the moving picture data. For example, the controller 170 analyzes motion vector information as shown in FIG. 2 from the moving picture data. The controller 170 also analyzes a motion of an image by using the motion vector information. Here, the motion of the image may be a movement of an image in a particular direction, a zoom-in of the image, or a zoom-out of the image as shown in FIG. 3. The motion of the image may include a still image which is not moved.

If the image is moved in a predetermined direction (e.g., to the left and right, upwards and downwards, or the like) in a predetermined section of a moving picture according to the result of analyzing the motion of the image by using the motion vector information, the controller 170 extracts the corresponding section as a panoramic section.

As described above, the controller 170 may extract a panoramic section by using motion vector information of moving picture data, but this is only an exemplary embodiment. Therefore, the controller 170 may analyze a motion of a characteristic dot to extract a panoramic section. For example, the controller 170 may decompress moving picture data, extract a characteristic dot of each image, and analyze a moving direction of a corresponding characteristic dot to extract a panoramic section. In this case, the controller 170 may divide an image into a plurality of blocks and extract characteristic dots of the plurality of blocks or extract a characteristic dot of the whole area of the image. Also, the controller 170 may analyze a motion of an image frame by using a difference value between the extracted characteristic dot and a neighboring pixel.

Figure 4:
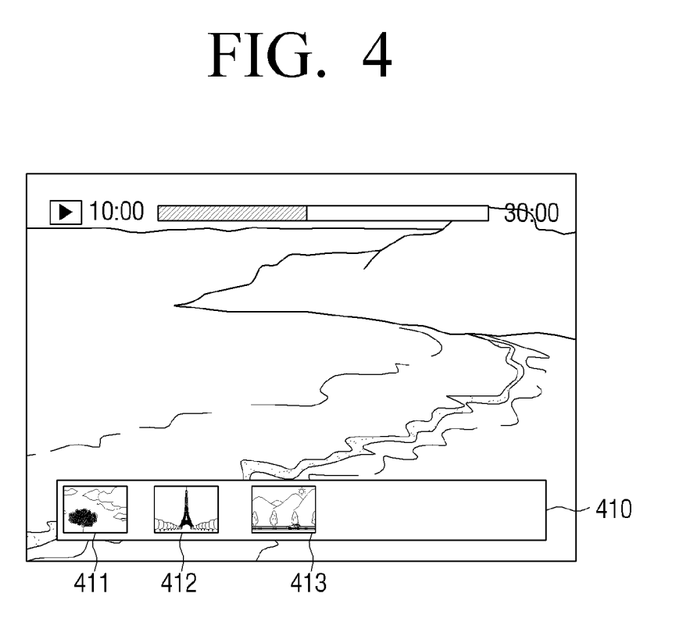

If a panoramic section is extracted as described above, the controller 170 displays at least one thumbnail image corresponding to the extracted at least one panoramic section on the display unit 130. Here, the thumbnail image may be a first image frame of the panoramic section. For example, the controller 170 displays the thumbnail image corresponding to the extracted panoramic section in a thumbnail image list 410 located at a bottom of a moving picture screen as shown in FIG. 4. Here, the thumbnail image list 410 includes first, second, and third thumbnail images 411, 412, and 413 respectively corresponding to first, second, and third panoramic sections.

Figure 5:
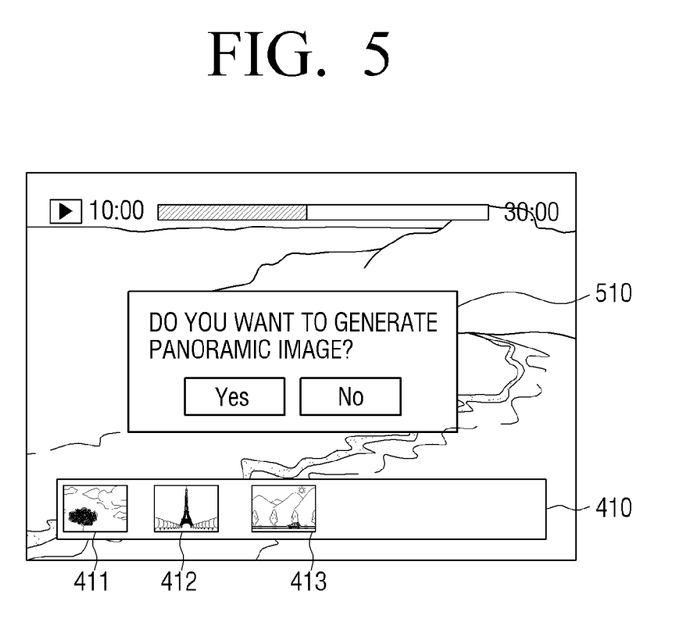
Figure 6:
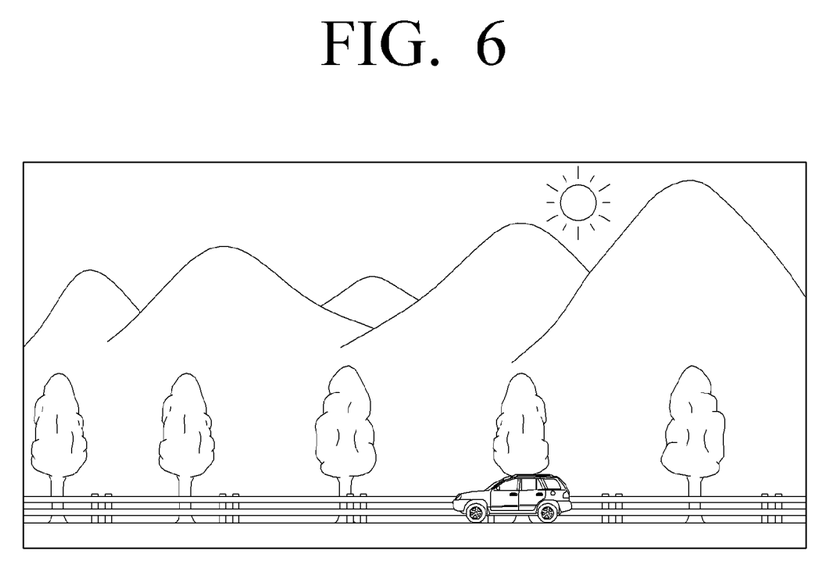

If a thumbnail image is selected from a thumbnail image list through the user input unit 160, the controller 170 generates a panoramic section corresponding to the selected thumbnail image as a panoramic image. For example, if the third thumbnail image 413 is selected from the thumbnail image list 410 through the user input unit 160, the controller 170 displays a UI 510 inquiring as to whether to generate a panoramic image, and highlights and displays the third thumbnail image 413 as shown in FIG. 5. If a user command which is to generate a panoramic image is input through the UI 510, the controller 170 generates a panoramic section corresponding to the third thumbnail image 413 as a panoramic image as shown in FIG. 6.

In detail, the controller 170 may overlap a plurality of image frames included in the panoramic section and interpolate overlapping boundary interfaces among the plurality of image frames to generate a panoramic image. In particular, if photographing setting conditions (an auto focus (AF), auto exposure (AE), etc.) of the plurality of image frames included in the panoramic section are changed, the controller 170 may calculate an average value of pixels included in an overlapping area of the plurality of image frames and generate a panoramic image by using a pixel the calculated average value.

The controller 170 may store the generated panoramic image in the storage unit 150 or an external database (DB). For example, the controller 170 may store the generated panoramic image and information about the panoramic image in the storage unit 150 which stores metadata of the moving picture data. The controller 170 may store the generated panoramic image and the information about the panoramic image in the moving picture data. The controller 170 may store the panoramic image as an additional image and store the information about the panoramic image in the moving picture data or the storage unit 150. Here, the information about the panoramic image may include a start time and an end time of a panoramic section of the moving picture data, a width, an area, and a data size of the panoramic image, and image data.

Figure 7:
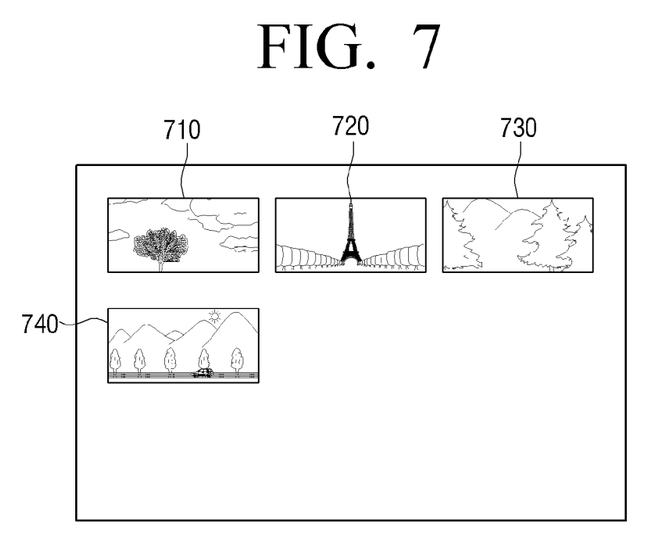

If a panoramic image list generating command is input via the user input unit 160 after the panoramic image is generated, the controller 170 generates and displays a panoramic image list including a plurality of panoramic images which have been generated. For example, if the panoramic image list generating command is input via the user input unit 160, the controller 170 may display a panoramic image list including first through fourth panoramic images 710 through 740 as shown in FIG. 7.

If one panoramic image is selected from the panoramic image list, the controller 170 plays a moving picture starting from a panoramic section corresponding to the selected panoramic image. For example, if the third panoramic image 730 is selected via the user input unit 160 as shown in FIG. 7, the controller 170 plays the moving picture starting from a third panoramic section corresponding to the third panoramic image 730.

As described above, although a user performs capturing without the aim of acquiring a panoramic image at a capturing time, the user may acquire a panoramic image later by using moving picture data. Also, the user may play moving picture data by using the generated panoramic image.

Figure 8:
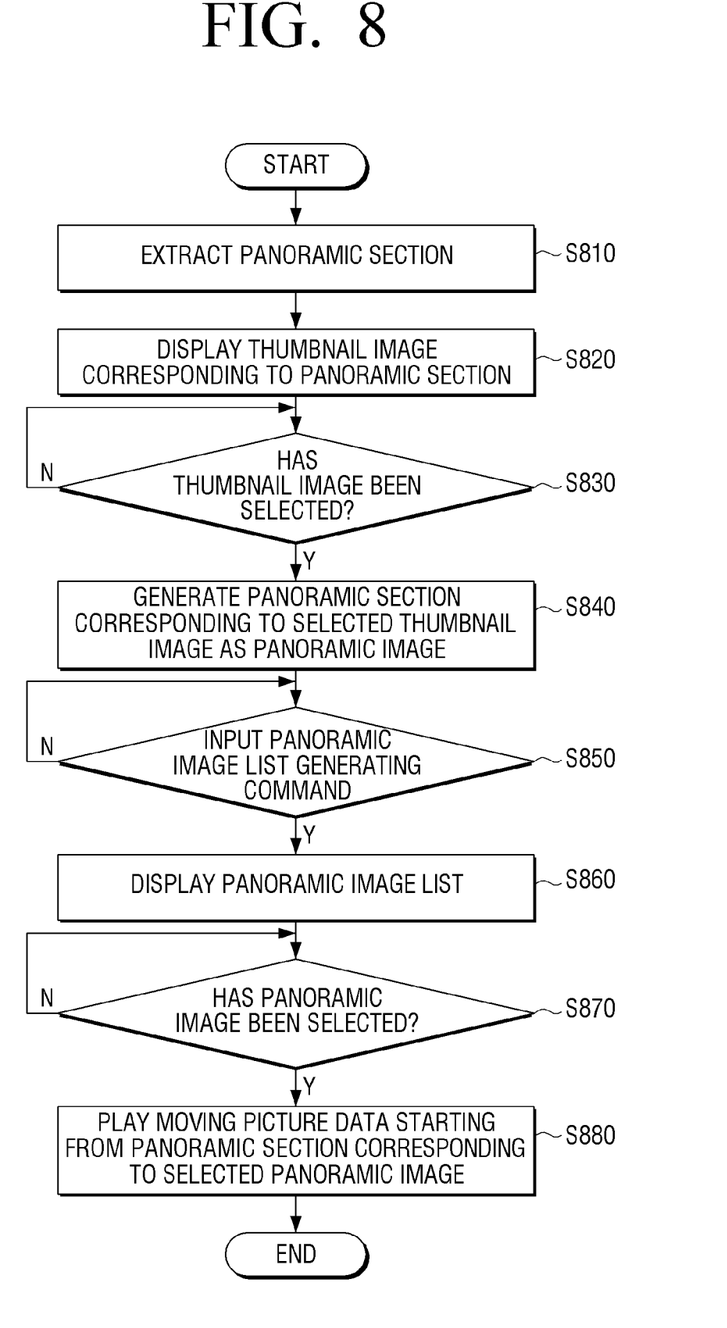
FIG. 8 is a flowchart illustrating a method of generating a panoramic image by using moving picture data according to an exemplary embodiment of the present general inventive concept.

A method of generating a panoramic image by using moving picture data will now be described with reference to FIG. 8.

In operation S810, the imaging device 100 extracts a panoramic section from moving picture data. Here, the panoramic section refers to a section in which a captured image is moved in a predetermined direction so as to generate a panoramic image. The imaging device 100 detects a motion vector image of the moving picture data or a moving direction of a characteristic dot to extract the panoramic section.

In operation S820, the imaging device 100 displays a thumbnail image corresponding to the extracted panoramic section. Here, the imaging device 100 may display the thumbnail image corresponding to the extracted panoramic section at a bottom of a moving picture screen which is being displayed as shown in FIG. 4.

In operation S830, the imaging device 100 determines whether a thumbnail image has been selected.

If it is determined in operation S830 that the thumbnail image has been selected, the imaging device 100 generates a panoramic section corresponding to the selected thumbnail image as a panoramic image in operation S840. In detail, the imaging device 100 may overlap a plurality of image frames included in the panoramic section and interpolate overlapping boundary interfaces to generate the panoramic image. In particular, if photographing setting conditions (e.g., AF, AE, etc.) of the plurality of image frames included in the panoramic section are changed, the imaging device 100 may calculate an average value of pixels included in an overlapping area of the plurality of image frames and generate the panoramic image by using a pixel having the calculated average value. The imaging device 100 may also store the generated panoramic image in the storage unit 150.

In operation S850, the imaging device 100 determines whether a panoramic image list generating command has been input.

If it is determined in operation S850 that the panoramic image list generating command has been input, the imaging device 100 displays a panoramic image list in operation S860. Here, the panoramic image list includes a plurality of panoramic images which have been generated.

In operation S870, the imaging device 100 determines whether a panoramic image has been selected from the panoramic image list.

If it is determined in operation S870 that the panoramic image has been selected from the panoramic image list, the imaging device 100 plays moving picture data starting from a panoramic section corresponding to the selected panoramic image in operation S880.

According to the above-described method, even if a user performs capturing without the aim of acquiring a panoramic image at a capturing time, the user may acquire a panoramic image later by using moving picture data. Also, the user may play moving picture data by using the generated panoramic image.

A program code to execute a method of generating a panoramic image according to the above-described various exemplary embodiments may be stored on various types of non-transient recording media. In detail, the program code may be stored on various types of terminal-readable recording media such as a Random Access Memory (RAM), a flash memory, a Read Only Memory (ROM), an Erasable Programmable ROM (EPROM), an Electronically Erasable and Programmable ROM (EEPROM), a register, a hard disk, a removable disk, a memory card, a universal serial bus (USB) memory, a CD-ROM, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method comprising:
extracting at least one panoramic section from moving picture data, each of the at least one panoramic section comprising a sequence of moving picture frames in which a captured image is moved in a certain direction and which contains data to generate a panoramic image;
displaying at least one thumbnail image respectively corresponding to the at least one panoramic section and a moving picture, together on a display screen; and
after one of the at least one thumbnail image is selected, generating a panoramic image from the at least one panoramic section corresponding to the selected thumbnail image,
wherein the selected thumbnail image is a first image frame of the at least one panoramic section,
wherein the sequence of moving picture frames includes a plurality of image frames that overlap with one another,
wherein the generation of the panoramic image comprises interpolating overlapping boundary interfaces of the plurality of image frames to generate the panoramic image, and
wherein if photographing setting conditions of the plurality of image frames included in the at least one panoramic section are changed, an average value of pixels comprised in an overlapping area of the plurality of image frames is calculated, and the panoramic image is generated by using a pixel having the calculated average value.

2. The method of claim 1, wherein the extracting comprises:
analyzing motion vector information of an image frame included in the moving picture data, and
determining a moving direction of an image through the analyzed motion vector information, to thereby extract the at least one panoramic section.

3. The method of claim 2, wherein the extracting comprises:
extracting a characteristic dot from the image frame in the moving picture data, and
determining a motion of the image according to a moving direction of the characteristic dot, to thereby extract the at least one panoramic section.

4. The method of claim 1, further comprising:
if the panoramic image is generated, storing the panoramic image and metadata of the panoramic image along with the moving picture data.

5. The method of claim 4, further comprising:
if the panoramic image is generated, storing the panoramic image and metadata of the panoramic image separately from the moving picture data.

6. The method of claim 1, further comprising:
displaying a panoramic image list comprising the generated panoramic image.

7. The method of claim 6, further comprising:
if a panoramic image is selected from the displayed panoramic image list, playing the moving picture data starting from a panoramic section corresponding to the selected panoramic image.

8. An imaging device comprising:
a display unit; and
a controller which
extracts at least one panoramic section from moving picture data, each of the at least one panoramic section comprising a sequence of moving picture frames in which a captured image is moved in a certain direction and which contains data to generate a panoramic image,
displays at least one thumbnail image respectively corresponding to the at least one panoramic section and a moving picture, together on the display unit, and
after one of the at least one thumbnail image is selected, generates a panoramic image from the at least one panoramic section corresponding to the selected thumbnail image,
wherein the selected thumbnail image is a first image frame of the at least one panoramic section,
wherein the sequence of moving picture frames includes a plurality of image frames that overlap with one another,
wherein the controller overlaps the plurality of image frames and interpolates overlapping boundary interfaces of the plurality of image frames to generate the panoramic image, and
wherein if photographing setting conditions of the plurality of image frames included in the at least one panoramic section are changed, the controller calculates an average value of pixels included in an overlapping area of the plurality of image frames and generates the panoramic image by using a pixel having the calculated average value.

9. The imaging device of claim 8, wherein the controller analyzes motion vector information of an image frame in the moving picture data and determines a moving direction of an image through the analyzed motion vector information, to thereby extract the at least one panoramic section.

10. The imaging device of claim 9, wherein the controller extracts a characteristic dot from the image frame constituting the moving picture data and determines a motion of the image according to a moving direction of the characteristic dot to extract the at least one panoramic section.

11. The imaging device of claim 8, further comprising:
a storage unit,
wherein if the panoramic image is generated, the controller controls the storage unit to store the panoramic image and metadata of the panoramic image along with the moving picture data.

12. The imaging device of claim 11, further comprising:
a storage unit,
wherein if the panoramic image is generated, the controller controls the storage unit to store the panoramic image and metadata of the panoramic image separately from the moving picture data.

13. The imaging device of claim 8, wherein the controller controls the display unit to display a panoramic image list comprising the generated panoramic image.

14. The imaging device of claim 13, wherein if a panoramic image is selected from the panoramic image list, the controller plays the moving picture data starting from a panoramic section corresponding to the selected panoramic image.

15. A non-transitory computer readable storage medium comprising:
instructions to control at least one hardware processor of an imaging device to:
extract at least one panoramic section from moving picture data, each of the at least one panoramic section comprising a sequence of moving picture frames in which a captured image is moved in a certain direction and which contains data to generate a panoramic image;

display at least one thumbnail image respectively corresponding to the at least one panoramic section and a moving picture, together on a display screen; and after one of the at least one thumbnail image is selected, generate a panoramic image from the at least one panoramic section corresponding to the selected thumbnail image, wherein the selected thumbnail image is a first image frame of the at least one panoramic section, wherein the sequence of moving picture frames includes a plurality of image frames that overlap with one another, wherein the generation of the panoramic image comprises interpolating overlapping boundary interfaces of the plurality of image frames to generate the panoramic image, and wherein if photographing setting conditions of the plurality of image frames included in the at least one panoramic section are changed, an average value of pixels comprised in an overlapping area of the plurality of image frames is calculated, and the panoramic image is generated by using a pixel having the calculated average value.

* * * * *